Sept. 20, 1932.  J. H. WILL  1,878,924
BLENDING DEVICE
Filed Sept. 6, 1930  3 Sheets-Sheet 1

Inventor
John Henry Will
By Cromwell, Greist & Warden
Attys.

Witness:
A. B. Davison

Sept. 20, 1932.  J. H. WILL  1,878,924
BLENDING DEVICE
Filed Sept. 6, 1930  3 Sheets-Sheet 2
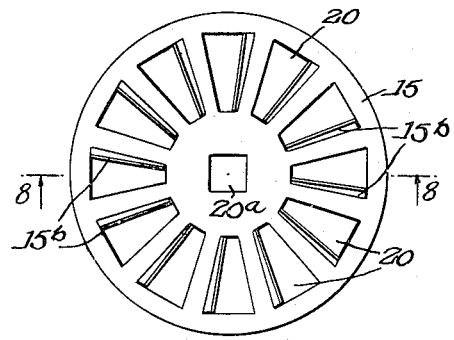
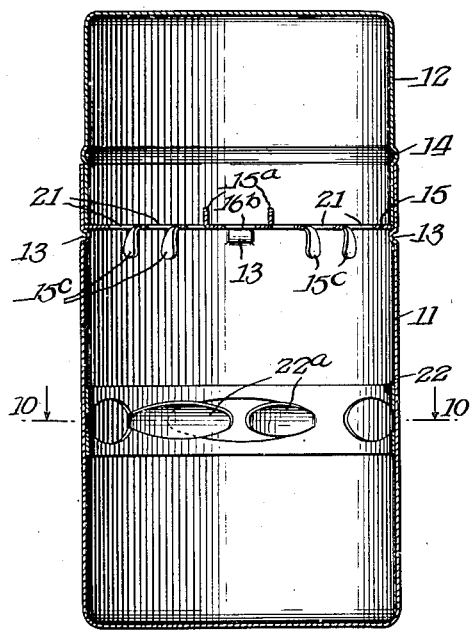
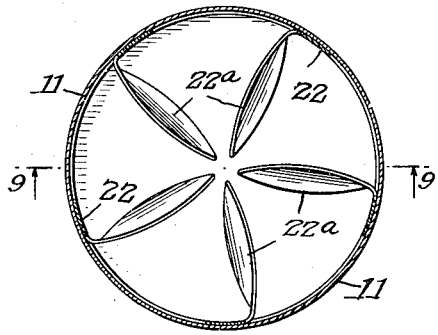
Inventor
John Henry Will Sept. 20, 1932. J. H. WILL 1,878,924
BLENDING DEVICE
Filed Sept. 6, 1930 3 Sheets-Sheet 3
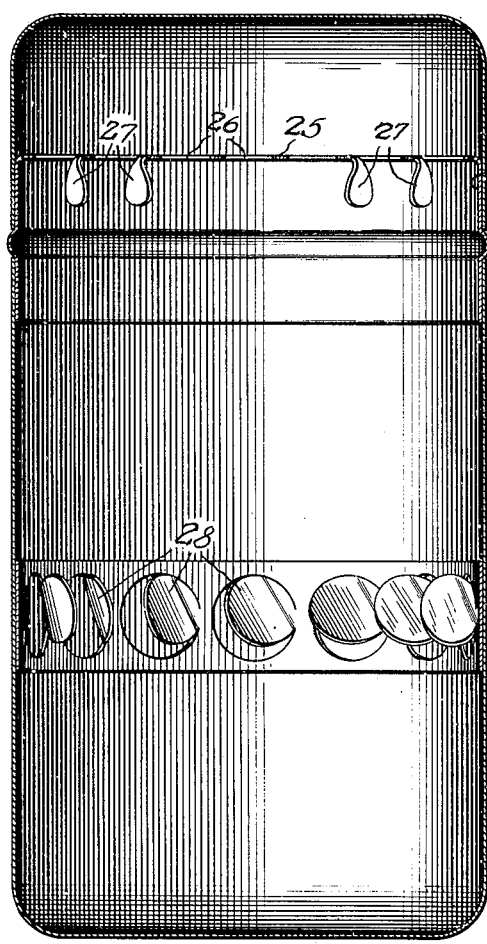
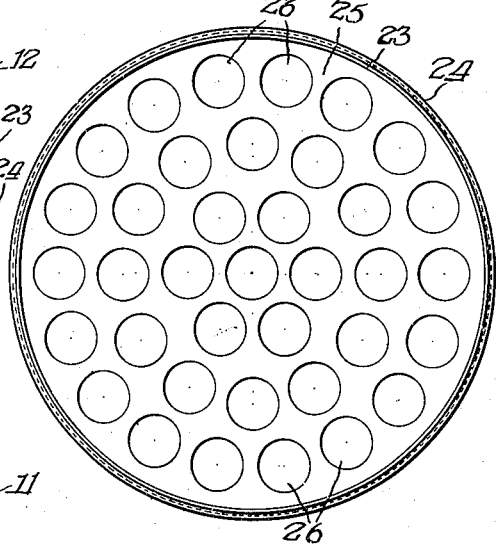
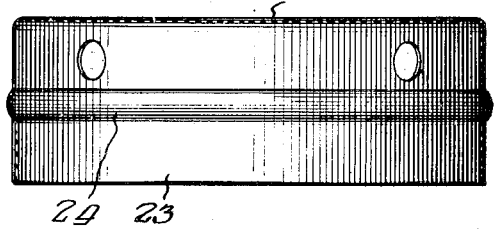
Inventor:
John Henry Will Patented Sept. 20, 1932

1,878,924

UNITED STATES PATENT OFFICE

JOHN HENRY WILL, OF CHICAGO, ILLINOIS, ASSIGNOR TO ARMOUR AND COMPANY, OF CHICAGO, ILLINOIS, A CORPORATION OF ILLINOIS

BLENDING DEVICE

Application filed September 6, 1930. Serial No. 480,069.

My invention relates generally to devices for effecting a thorough admixture of pulverulent material and particularly the blending of toilet powders.

In the cosmetic trade the practice is growing of providing small kits, each including a box of basic powder and several boxes of colored powders such as brown, pink, blue and white, accompanied by formulæ whereby the purchaser may blend face powders suited to the needs of her individual complexion, shade of eyes and hair, and for use under artificial or natural light.

An important accessory to such a toilet kit of colored powders is some convenient device whereby various powders may be easily and successively blended in the proportions specified in the formulæ. Imperfect blending results in small isolated particles of color, not noticeable to the eye when en mass but likely to leave a definite colored streak when rubbed on the skin.

It is to provide a simple, inexpensive device, whereby perfect blending of the ingredients may be readily obtained, that is the primary object of this invention.

In order to facilitate an understanding of the same, preferred and modified embodiments thereof are set forth in the following description predicated upon drawings wherein Fig. 1 is a longitudinal sectional view of such a device;

Figs. 3, 4, 5 and 7 are plan views of modified forms of inserts;

Figs. 6 and 8 are diametric sections through the inserts of Figs. 5 and 8 respectively;

Fig. 9 is a vertical sectional view of a modified form of device;

Fig. 10 is a plan view of the insert shown in Fig. 9;

Fig. 11 is a sectional view of yet another form of the device;

Fig. 12 is a plan view of the insert of Fig. 11; and

Fig. 13 is a side elevation of the insert of Fig. 12.

As illustrated in Figs. 1 to 10 inclusive the device comprises two cup-like members 11 and 12, both of substantial depth, the total depth being substantially in excess of the diameter, the former having an interior rib 13 near its open end and the latter preferably having an exterior rib 14 against which the upper edge of the member 11 is adapted to abut when the two members are arranged in closed telescopic relation.

Figure 1:
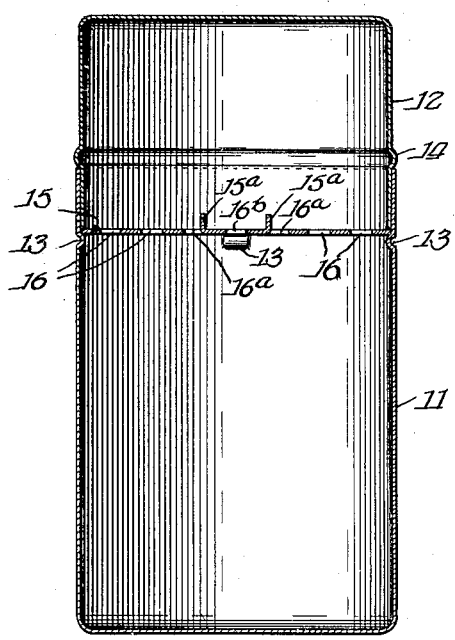
Figure 2:
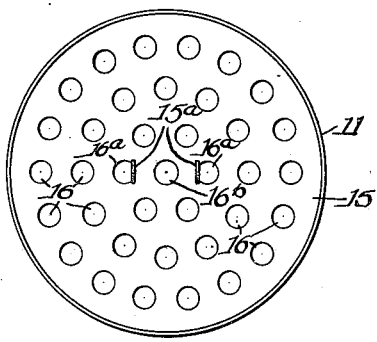
Fig. 2 is a plan view of the insert shown in Fig. 1.

An insert 15, according to Figs. 1 and 2 in the form of a disk, provided with round apertures 16 arranged in concentric series, fits snugly within the member 11 and rests upon the rib 13 while the open edge of the member 12 bears upon the upper peripheral face of the disk 15, whereby the latter is held in position. Certain of the apertures $16^a$ do not have the metal entirely removed therefrom but upturned as indicated at $15^a$ to form ears serving as handles by which the disk may be conveniently inserted.

The insert may be in the form illustrated in Figs. 1 and 2 or it may be of modified form as indicated in Figs. 3 to 13 inclusive.

Figure 3:
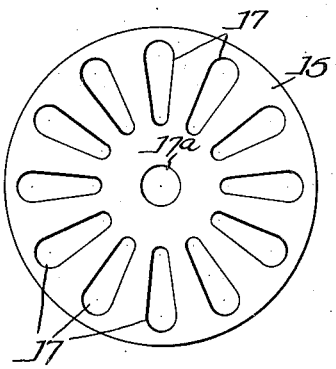
Figure 5:
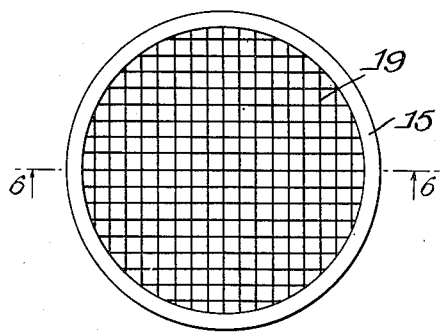
Figure 4:
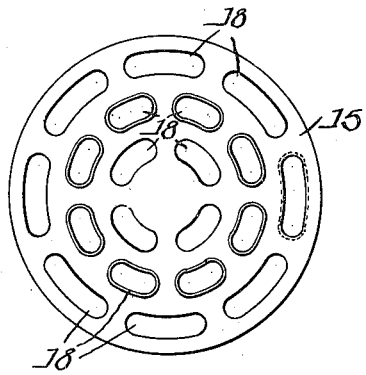
Figure 6:
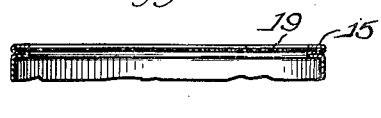

In Fig. 3 the apertures are in the form of radially disposed slots 17 with a central aperture $17^a$; in Fig. 4 the apertures are in the form of segmental slots 18 arranged in concentric series; in Figs. 5 and 6 the disk 15 is in the form of an annulus enclosing wire netting 19 the interstices of which form apertures; in Figs. 7 and 8 the disks 15 are formed with radially extending wedge-shaped polygonal slots 20 having the metal at one side thereof bent away from the plane of the disk to form vanes $15^b$ disposed at an oblique angle to the axis of the disk, while a central polygonal aperture $20^a$ is provided, with or without vanes; while in Fig. 9 certain of the apertures 21 have downturned twisted tongues $15^c$. The disk 15, of whatever form, divides the interior of the mixing device into two compartments connected only by the apertures within the disk.

Advantageously, other vanes may be disposed about the interior wall of one of the cup-like members, preferably by fixing to the interior of the member 11 an annular strip of metal 22 having certain portions of its periphery projected inwardly towards the center and at an inclination to the axis of the device, as illustrated at 22ª in Figs. 9 and 10, said vanes reaching to a point near the center of the member 11.

As illustrated in Figs. 11 to 13 inclusive, the two cup-like members 11 and 12 are shown as of the same diameter and not telescopically arranged with reference to each other, but each telescopes over an edge of an insert 23 provided with a medial circumferential rib 24 and closed at one end by a diaphragm 25 against which the edges of the members 11 and 12 abut. This diaphragm is provided with a plurality of apertures 26, some of which may have the metal not entirely removed but depressed to form vanes 27 arranged at an oblique angle to the axis and to the radius of the cup-like members and the insert. The insert thus divides the interior of the mixing device into two compartments separated by the foraminous diaphragm 25; the relative capacity of the two compartments may be varied by reversing the position of the insert so as to bring the diaphragm 25 nearer one end or nearer the center of the device as a whole. Advantageously, other vanes 28 may be disposed about the interior wall of one of the cup-like members, preferably that of greater depth. These vanes are also disposed at an angle to the axis of the receptacle.

The various powders to be blended are placed in the member of greater depth, the insert is then placed within such member, and the smaller cup-like member is then telescoped within the large member, as shown in Figs. 1 to 10 inclusive, or over the projecting edge of the insert as shown in Figs. 11 to 13 inclusive. A vigorous shaking of the device substantially in line with its axis will cause the powder to travel from one end to the other through the apertures, being the while given a whirling action by means of the vanes disposed obliquely to the axis and radius. Thus a thorough mixing and blending of the various kinds of powder is effected quickly and with certainty.

I claim:

1. A blending device comprising two cup-like members of dissimilar depth, the interior provided with stationary vanes disposed about the wall thereof at an oblique angle to the axis, and an insert disposed within the members and dividing the interior into two compartments of unequal capacity, said insert provided with apertures flanked by vanes disposed at an oblique angle to the axis thereof and at an angle to the first mentioned vanes, the cup-like members arranged in alignment and in telescopic relation to the insert and separated by a rib.

2. A blending device comprising two cup-like members of the same diameter but of dissimilar depth, and an insert disposed between and partially within both of the members and dividing the interior into a plurality of compartments, said insert having a medial circumferential rib and closed by a diaphragm provided with apertures flanked by vanes disposed at an angle to the axis thereof, the cup-like members arranged in alignment and in telescopic relation to the insert and separated by the rib, the insert being reversible to bring its diaphragm wall into either of the cup-like members at will.

3. A powder blending device comprising two cup-like members of similar diameter and both of substantial capacity disposed in axial alignment, a third member having an outside diameter corresponding to the inside diameter of the other members and comprising a cup-like member with an apertured end wall, the third member adapted to be inserted in the first two members to divide the interior into two chambers and for reversal therein to vary the relative capacity of the chambers, the device including means for positioning the insert at a definite place within the first two members.

4. A powder blending device comprising two cup-like members of similar diameter and both of substantial capacity disposed in axial alignment mouth to mouth and having an aggregate depth greater than their diameter, a third member having an outside diameter corresponding to the inside diameter of the other members and comprising a relatively shallow cup-like member with an apertured end wall, the third member adapted to be inserted within the first two members adjacent the division line therebetween to divide the interior into two chambers and for reversal therein to vary the relative capacity of the chambers at each side of the insert, the device including means for securing the insert in position, and vanes flanking the apertures in the end wall of the insert, said vanes disposed in oblique relationship to the axis of said apertures.

In testimony whereof I have hereunto subscribed my name.

JOHN HENRY WILL.